May 20, 1958 E. F. ROTHENBERGER 2,835,469
IRRIGATION DITCH GATE VALVE
Filed July 22, 1957
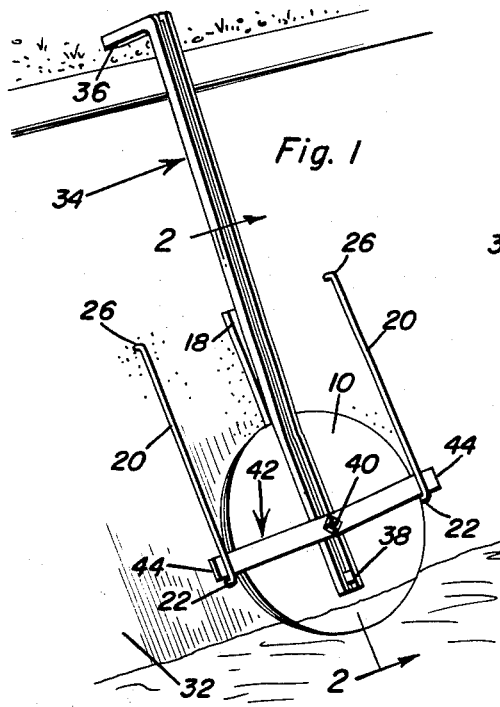
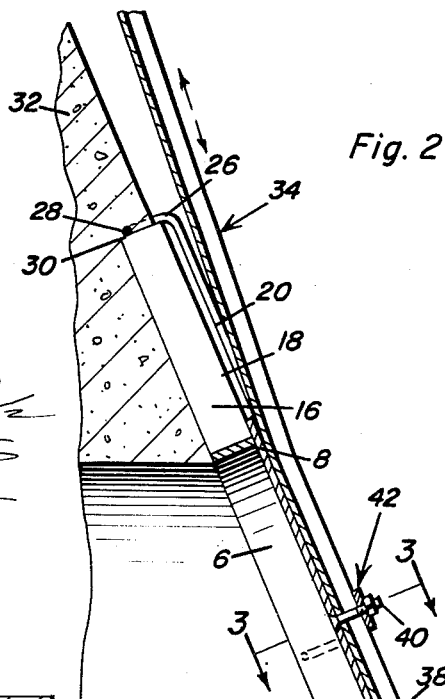
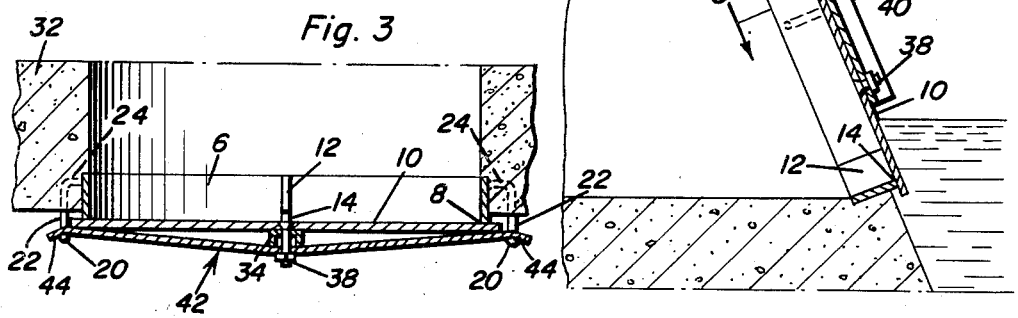
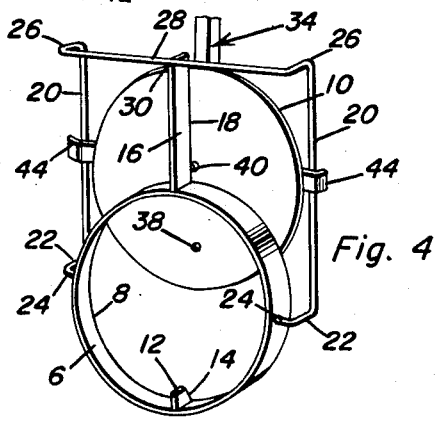
Ellis F. Rothenberger
INVENTOR.

United States Patent Office 2,835,469
Patented May 20, 1958

2,835,469

IRRIGATION DITCH GATE VALVE

Ellis F. Rothenberger, Fullerton, Calif.

Application July 22, 1957, Serial No. 673,184

6 Claims. (Cl. 251—147)

The present invention relates to certain new and useful improvements in a gate valve which is especially well adapted to efficient and reliable use when employed in an irrigation ditch, at the end of a conduit, pipe or the like.

Gate valves are of many and varied types and forms. Therefore, it is to be pointed out here that the present invention relates to the type of valve wherein the valve seat is provided by one edge of a collar or ring and the valve itself takes the form of a disk or lid which normally rests upon the seat and has firm sliding contact therewith during the opening and closing movements of said disk.

As is perhaps evident from the preceding paragraph the instant valve construction is not wholly unlike prior art adaptations in which the structural elements touched upon are similarly employed.

It follows that it is an object of the instant invention to structurally, functionally and otherwise improve upon gate valves in the category stated. One problem which is encountered in valves in this field is that mud, debris and similar extraneous matter often collects upon the valve surfaces and seat and interferes with the satisfactory closing of the valve with the result that the valve leaks.

With a view toward aptly solving the problem posed the herein disclosed construction is such that the valve disk is coordinated with the valve seat in such a way that the closing surfaces of the valve and seat are scraped clean by the sliding action of the valve and, more specifically, by the special spring and the way in which the spring centrally imposes the necessary pressure on the valve to render the same substantially self-cleaning.

In addition, the spring construction and arrangement at the center of the lid or valve results in even or uniform yielding pressure at all times even when the lid is pulled open to let the water through at any desired amount during which time the constant spring pressure exerted wipes all foreign particles from the valve seat and when the valve is pushed over the seat it acts to shear moss, grass and weeds such as would otherwise render the valve leaky.

Then, too, in carrying out the principles of the invention an elongated push-pull member has its lower end attached to the central cup portion of the valve disk and by attaching the central portion of a properly constructed leaf spring to the attached end-portion of the handle, the handle pressing on the valve distributes the pressure and results in effectual closing of the valve. Furthermore, the spring is a simple leaf spring exerting its tension on the central portion of the valve and having free end portions which are laterally bent. These end portions have sliding engagement with and ride along spaced parallel guide members anchored in the concrete on diametrically opposite sides of the valve with the result that the cooperation of the guide members and spring-ends renders the guide members self-cleaning. By keeping the spring ends and guide members clear and clean efficient operation of all parts is insured at all times.

Furthermore, novelty is predicated on a valve construction which is characterized by a first stationary unit embodying a ring, one edge of which constitutes a valve seat, a pair of spaced parallel guide members joined rigidly to diametrically opposite portions of said ring; and a second unit movable relative to said first unit and embodying a valve disk normally covering the ring and seated atop said valve seat, a push-pull member serving as a handle and secured at one end to said disk, and a leaf spring tensioned to apply pressure to and effectually close and keep said valve disk closed, said spring being attached midway of its ends to the central portion of the disk and having free outer ends slidingly engaging the respective guide members, said outer ends projecting laterally beyond the guide members and being under tension and the terminals thereof being laterally bent and having retentive cooperation with said guide members.

Other objects, features and advantages will become more readily apparent from the following description and the accompanying drawing.

In the drawing, wherein like numerals are employed to designate like parts throughout the views:

Fig. 1 shows a fragmentary portion of one wall of the concrete lining in an irrigation ditch and shows, what is more important, a perspective illustration of the improved gate valve with the valve closed;

Fig. 2 is a section on a larger scale taken on the plane of the line 2—2 of Fig. 1, looking in the direction of the arrows;

Fig. 3 is a section on the line 3—3 of Fig. 2; and

Fig. 4 is a perspective view showing the essential components with the valve slid to a half-open position.

Reference may be made first to Fig. 4 wherein it will be seen that the first or relatively stationary unit comprises an annular collar, or band which is here referred to as a valve seating ring 6. The outer marginal edge portion 8 is precision made to function as a seat for the disk-like lid or valve 10. It will be noticed that there is a short lug 12 extending radially from what may be called the center of the bottom half of the ring. This projects from the inner periphery of the ring and has a slightly beveled or cam surface 14, the purpose of which as seen in Fig. 2 is to assist greatly in seating the leading or downward edge portion of the valve. Diametrically opposite to the lug and extending from the outer periphery of the ring is a valve bracing and supporting member. This takes the form of a rigid strip member or leg 16 having a straight edge 18 which is flush with the valve seat and which provides an effective support for the valve disk in any one of its partly open or fully opened positions. With a portion of the valve resting atop the seat 8 and also atop the supporting edge 18 one can appreciate the advantage of this unique ring construction.

A wire rod frame also forms an integral part of the unit under consideration. Actually this embodies a pair of spaced parallel guide members 20 having laterally bent lower ends 22 with turned in terminals 24 rigidly attached to diametrically opposite sides of the outer periphery of the ring 6. The upper laterally directed ends 26 join with end portions of a transverse reinforcing rod 28. The intermediate portion of this rod is welded or otherwise fixed at 30 to the free end of the support strip or member 16. As seen in Fig. 1 this reinforcing rod is actually embedded in the concrete wall or surface 32 when installed. As a matter of fact the lower half portion of the ring is also embedded as seen in Fig. 2 as are the bends 22 and 24. Consequently this unit is securely embedded in the concrete. It is to be mentioned also that the lower half portion of the support member 16 is also embedded and this occupies a position midway between the guide members 20 with the upper ends of the latter extending well above the ring and valve when the valve is closed.

The movable unit called the second unit is also novel in that it includes the disk valve or lid 10 and handle and spring means. The handle is a push-pull member and is denoted by the numeral 34. It has the desired reach and the upper end 36 is bent laterally to facilitate handling the valve from a remote point. It will be noticed that this push-pull member is channel-shaped in cross section and that the lower end portion rests atop the valve where it is bolted at its lower end to the valve as denoted at 38. There is also a bolt 40 passing through the web of the channel and valve and this bolt serves not only to fasten down the push-pull member but also the leaf spring 42. That is to say the central or median portion of the spring rests atop the channel flanges and is bolted in place so that the spring is bowed as shown in Fig. 3. The free outer ends extend through and beyond the spaces defined between the guide members and the surface of the concrete. These spaces are guideways for said end portions and the end portions are bent laterally away from the wall as denoted at 44 to thus provide the desired interaction and also the self-cleaning action previously mentioned.

In Figs. 1–3 the valve is shown closed and in Fig. 4 the valve is shown partly open. The last named figure serves to bring out the simultaneous contact of the lower segmental portion of the valve with the upper half portion of the valve seat 8 and also shows how the median portion of the valve is caused to rest on the edge 18 where it is properly braced and stabilized to effect satisfactory opening and closing of the valve. With this construction one may open the valve fully or part way while still maintaining the self-wiping and cleaning functions stated.

By utilizing two units as shown and described installation in an easy and ready manner is assured. Then too with this construction the separability of the spring and push-pull handle means makes for easy replacement and adjustment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A manually operable mechanical valve construction for use in an irrigation ditch comprising a first stationary unit embodying a ring, one edge of which constitutes a valve seat, a pair of spaced parallel guide members joined rigidly to diametrically opposite portions of said ring; and a second unit movable relative to said first unit and embodying a valve disk normally covering the ring and seated atop said valve seat, a push-pull member serving as a handle and secured at one end to said disk, and a leaf spring tensioned to apply pressure to and effectually close and keep said valve disk closed, said spring being attached midway of its ends to the central portion of the disk and having free outer ends slidingly engaging the respective guide members, said outer ends projecting laterally beyond the guide members and being under tension and the terminals thereof being laterally bent and having retentive cooperation with said guide members.

2. The structure defined in claim 1, and wherein said ring is provided at its lower segmental portion with a radial lug projecting into the ring from the inner periphery of the ring to assist in seating the leading edge portion of the valve disk when said disk is being moved from an open, or partially open position, to a fully closed position.

3. The structure defined in claim 2, and in combination, an elongated valve disk supporting member fixed to the ring and radiating therefrom and situated between and parallel to opposed portions of said guide members and serving in conjunction with the upper segmental portion of the ring to maintain the valve disk level and to make it possible to slide the valve disk to and fro, whereby to make it possible to open the valve wholly or partially to any degree desired.

4. The structure defined in claim 3, and wherein said added supporting member comprises a rigid strip of metal corresponding to the strip-metal in said ring and having its lengthwise edges flush with the top and bottom edges of said ring.

5. A manually operable mechanical valve construction for use in an irrigation ditch comprising a first stationary unit embodying a ring, one edge of which constitutes a valve seat, a pair of spaced parallel guide members joined rigidly to diametrically opposite portions of said ring; and a second unit movable relative to said first unit and embodying a valve disk normally covering the ring and seated atop said valve seat, a push-pull member serving as a handle and secured at one end to said disk, and a leaf spring tensioned to apply pressure to and effectually close and keep said valve disk closed, said spring being attached midway of its ends to the central portion of the disk and having free outer ends slidingly engaging the respective guide members, said outer ends projecting laterally beyond the guide members and being under tension and the terminals thereof being laterally bent and having retentive cooperation with said guide members, said guide members being linearly straight with short laterally bent end portions, the lower bent end portions being joined to said diametrical portions of the ring and the upper laterally bent end portions being spaced above the ring and being joined to a reinforcing and anchoring rod spanning the space between and at right angles to said guide member.

6. The structure defined in claim 5, and in combination, an elongated valve disk supporting member fixed to the ring and radiating therefrom and situated between and parallel to opposed portions of said guide members and serving in conjunction with the upper segmental portion of the ring to maintain the valve disk level and to make it possible to slide the valve disk to and fro, whereby to make it possible to open the valve wholly or partially to any degree desired, and the median portion of reinforcing rod being in a plane with and welded to the extreme upper end of said strip member.

References Cited in the file of this patent

UNITED STATES PATENTS

| | | |
|---|---|---|
| 969,320 | Worley | Sept. 6, 1910 |
| 1,063,438 | Harlan | June 3, 1913 |